United States Patent
Pascual Avila et al.

(10) Patent No.: US 9,432,451 B2
(45) Date of Patent: Aug. 30, 2016

(54) METHODS, SYSTEMS, AND COMPUTER READABLE MEDIA FOR COMMUNICATING MEDIA SERVER CAPABILITIES AND STATUS INFORMATION BETWEEN MEDIA SERVERS AND A MEDIA RESOURCE BROKER

(75) Inventors: Victor Pascual Avila, Barcelona (ES); Dorgham Sisalem, Berlin (DE)

(73) Assignee: TEKELEC, INC., Morrisville, NC (US)

( * ) Notice: Subject to any disclaimer, the term of this patent is extended or adjusted under 35 U.S.C. 154(b) by 592 days.

(21) Appl. No.: 12/965,464

(22) Filed: Dec. 10, 2010

(65) Prior Publication Data

US 2011/0145407 A1  Jun. 16, 2011

Related U.S. Application Data

(60) Provisional application No. 61/286,772, filed on Dec. 15, 2009.

(51) Int. Cl.
  *G06F 15/173* (2006.01)
  *H04L 29/08* (2006.01)
  *H04L 29/06* (2006.01)

(52) U.S. Cl.
  CPC ....... *H04L 67/1029* (2013.01); *H04L 65/1006* (2013.01); *H04L 65/1069* (2013.01); *H04L 67/1002* (2013.01); *H04L 67/1036* (2013.01)

(58) Field of Classification Search
  CPC ............ H04L 12/145; H04L 12/2439; H04L 41/0896; H04L 49/9084; H04J 3/22
  See application file for complete search history.

(56) References Cited

U.S. PATENT DOCUMENTS

| | | | |
|---|---|---|---|
| 6,128,644 A * | 10/2000 | Nozaki ................... | G06F 9/505 709/201 |
| 6,728,748 B1 * | 4/2004 | Mangipudi et al. .......... | 718/105 |
| 8,230,098 B2 * | 7/2012 | Chen et al. .................... | 709/231 |
| 8,255,456 B2 * | 8/2012 | Sundarrajan et al. ........ | 709/203 |
| 2005/0114159 A1 * | 5/2005 | Ozugur et al. ..................... | 705/1 |
| 2005/0232408 A1 * | 10/2005 | Hodson et al. .......... | 379/265.02 |
| 2008/0301747 A1 * | 12/2008 | Yan ........................ | H04L 41/12 725/118 |
| 2008/0307108 A1 * | 12/2008 | Yan et al. ..................... | 709/231 |
| 2009/0254674 A1 * | 10/2009 | Leiden et al. ................ | 709/232 |
| 2010/0023579 A1 * | 1/2010 | Chapweske ........ | H04N 7/17336 709/203 |
| 2010/0046546 A1 * | 2/2010 | Ram et al. .................... | 370/468 |

(Continued)

OTHER PUBLICATIONS

AppTrigger, "Solution Brief," www.apptrigger.com (Publication date unknown).

(Continued)

*Primary Examiner* — Mohamed Wasel
*Assistant Examiner* — Tsung Wu
(74) *Attorney, Agent, or Firm* — Jenkins, Wilson, Taylor & Hunt, P.A.

(57) ABSTRACT

Methods, systems, and computer readable media for communicating media server capabilities and status information between a plurality of media servers and a media resource broker are disclosed. According to one method, messages are received at a media resource broker from a plurality of media servers, where the messages include information indicating capabilities and status of the media servers. The information regarding the capabilities and status of the media servers is cached at the media resource broker, which receives call setup requests and, in response, selects a media server from the plurality of media servers based on the cached media server capabilities and status information.

15 Claims, 5 Drawing Sheets

(56) References Cited

U.S. PATENT DOCUMENTS

2010/0150335 A1* 6/2010 Dowdy .................... 379/221.01
2010/0271947 A1* 10/2010 Abdelal ................ H04L 47/263
370/235

OTHER PUBLICATIONS

Boulton et al., "Media Resource Brokering," Network Working Group Internet Draft (Apr. 13, 2011).
Hilt et al., "Session Initiatio Protocol (SIP) Overload Control," SIPPING Working Group Internet Draft (Apr. 26, 2010).
Sisalem et al., "MRB-Media Server Interaction Mechanisms," MEDIACTRL WG Internet Draft, (Sep. 21, 2009).
Melanchuk, "An Architectural Framework for Media Server Control," Network Working Group, RFC 5567 (Jun. 2009).
Dolly et al., "Media Server Control Protocol Requirements," Network Working Group, RFC 5167 (Mar. 2008).
Walker, "Media Resource Broker SIP Client Implementation Agreement," MultiService Forum, Protocol and Control, (Aug. 14, 2006).
Burger et al., "Basic Network Media Services with SIP," Network Working Group, RFC 4240 (Dec. 2005).
Rosenberg et al., "SIP: Session Initiation Protocol," Network Working Group, RFC 3261 (Jun. 2002).
Rescorla, "HTTP Over TLS," Network Working Group, RFC 2818 (May 2000).
Fielding et al., "Hypertext Transfer Protocol—HTTP/1.1," Network Working Group, RFC 2616 (Jun. 1999).
Bradner, "Key Words for Use in RFCs to Indicate Requirement Levels," Network Working Group, RFC 2119 (Mar. 1997).

* cited by examiner

METHODS, SYSTEMS, AND COMPUTER READABLE MEDIA FOR COMMUNICATING MEDIA SERVER CAPABILITIES AND STATUS INFORMATION BETWEEN MEDIA SERVERS AND A MEDIA RESOURCE BROKER

PRIORITY CLAIM

This application claims the benefit of U.S. Provisional Patent Application Ser. No. 61/286,772 filed Dec. 15, 2009; the disclosure of which is incorporated herein by reference in its entirety.

TECHNICAL FIELD

The subject matter described herein relates to supporting media resource delivery provided by media servers. More specifically, the subject matter relates to methods, systems, and computer readable media for communicating media server capabilities and status information between media servers and a media resource broker.

BACKGROUND

In communications networks, a media server is a computing component that processes media streams (e.g., audio and/or video) associated with telephone calls, or other connections, in order to provide media processing functions associated with core telephony services. Media services provided by a media server may include services such as announcement, conferencing, interactive voice response (IVR), and dual tone multi frequency (DTMF) services.

In order to route requests for media services to media servers, additional network components (i.e., one or more controlling entities) have been used to assist in media server selection so that the most appropriate resource is selected for a particular operation. Originally, application servers (AS) were used to find the appropriate media server required for offering a given service. Conventionally, application servers maintained an up-to-date overview of all the available media servers, the capabilities of these servers, and their statuses. Because an application server may control multiple media server instances at any one time, assisting in media server resource selection can be processing intensive and, therefore, negatively impact the ability of application servers to perform other important functions. In order to relieve application servers from having to maintain an up-to-date overview of one or more media servers, a media resource broker (MRB), located between the application servers and the media servers was introduced for receiving requests from application servers for certain services and deciding which media server should handle each request.

However, one problem associated with current media resource delivery architectures that include media resource brokers is that because media servers may possess different media capability sets (i.e., media servers may offer different media services), it can be difficult and slow for media resource brokers to determine the appropriate media server. For example, different media servers may provide similar media functionality, but may have different capacities or media codec support. It is important for the media resource broker to know the capacity and status of each media server in order to properly route queries requesting services provided by the media servers.

Accordingly, in light of these difficulties, a need exists for improved methods, systems, and computer readable media for communicating media server capabilities and status information between a plurality of media servers and a media resource broker.

SUMMARY

Methods, systems, and computer readable media for communicating media server capabilities and status information between a plurality of media servers and a media resource broker are disclosed. According to one method, messages are received at a media resource broker from a plurality of media servers, where the messages include information indicating capabilities and status of the media servers. The information regarding the capabilities and status of the media servers is cached at the media resource broker, which receives call setup requests and, in response, selects a media server from the plurality of media servers based on the cached media server capabilities and status information.

A media resource broker for communicating media server capabilities and status information with a plurality of media servers is also disclosed. The media resource broker may include a communications module for receiving messages from a plurality of media servers, where the messages include information indicating capabilities of the media servers. The media resource broker may further include a media server capabilities and status information cache for caching the information regarding the capabilities of the media server. The media resource broker may further include a media server selection module for receiving call setup requests and, in response, for selecting media servers from the plurality of media servers using the cached media server capabilities and status information.

The subject matter described herein for communicating media server capabilities and status information between a plurality of media servers and a media resource broker may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for communicating media server capabilities and status information between a plurality of media servers and a media resource broker. The subject matter described herein provides for a many-to-many relationship between application servers and media servers and in one embodiment, existing HTTP/HTTPS mechanisms may be used to enable the media servers to publish their capabilities and allow media resource brokers to receive information about the capabilities and monitor the status of these media servers. By using existing mechanisms, the overall implementation complexity of communication protocols between MRBs and media servers may be minimized.

Figure 1:
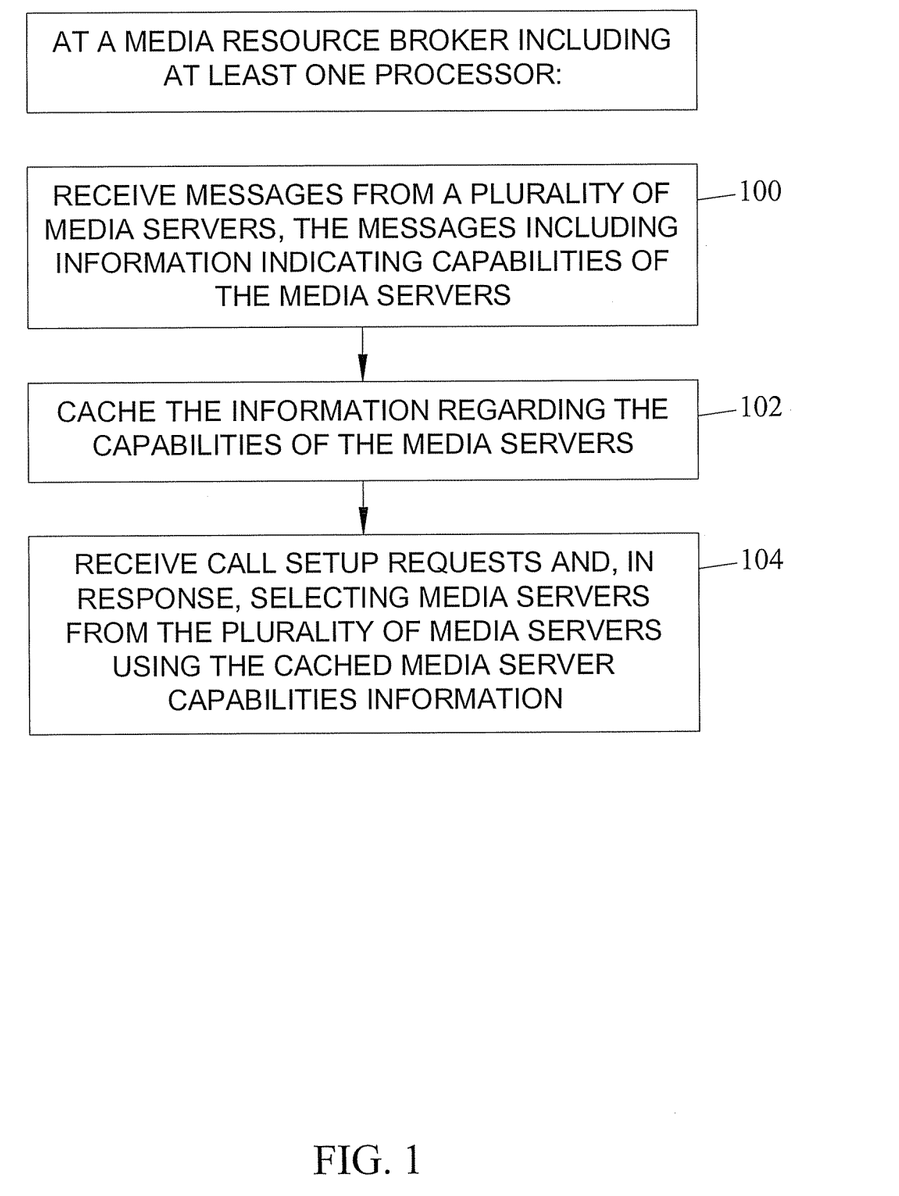
FIG. 1 is a flow chart showing an exemplary process for communicating media server capabilities and status information between a plurality of media servers and a media resource broker according to an embodiment of the subject matter described herein.

FIG. 1 is a flow chart showing an exemplary process for communicating media server capabilities and status information between a plurality of media servers and a media resource broker according to an embodiment of the subject matter described herein. The process may be performed at a media resource broker including at least one processor. Referring to FIG. 1, at step 100, messages may be received from a plurality of media servers, where the messages include information indicating capabilities of the media servers. In one embodiment, information may be "pushed" from the media servers to the MRB without requiring that the MRB request, poll, or query each media server for the information. For example, the MRB may receive media server Publish Capabilities messages from the media servers. In another embodiment, the MRB may subscribe to capabilities and status information for a plurality of media servers and, in response, "watched" media servers may automatically send capabilities and status information to an associated "watcher" MRB. For example, the MRB may receive Notify messages from the media servers in the context of subscriptions between the media resource broker and the media servers.

At step 102, information regarding the capabilities of the media servers may be cached at the MRB. For example, cached media server capabilities and status information and status data may be stored in memory using a table located at the MRB. The table (or other data structure) may be indexed by media server identifier and/or network address. For each media server, capabilities and status data may include services provided by the media server, service features, call volume capacity, call rate capacity, and congestion status. This allows for the MRB to be aware of the current capabilities and statuses of each media server so that the MRB may effectively route media resource requests to the appropriate media server.

At step 104, call setup requests may be received and, in response, media servers may be selected from the plurality of media servers using the cached media server capabilities and status information. For example, a client may send a SIP INVITE message requesting IVR services from a media server which may be received or intercepted by the MRB. The MRB may consult its cached information about the capabilities and status of the media servers and may route the INVITE message to an appropriate media server. The determination made by the MRB may be based on, for example, the media server being the only media server that is capable of providing the IVR service or, alternatively if more than one media server is capable of providing the service, based on the media server with the highest call capacity or some other combination of criteria.

Figure 2:
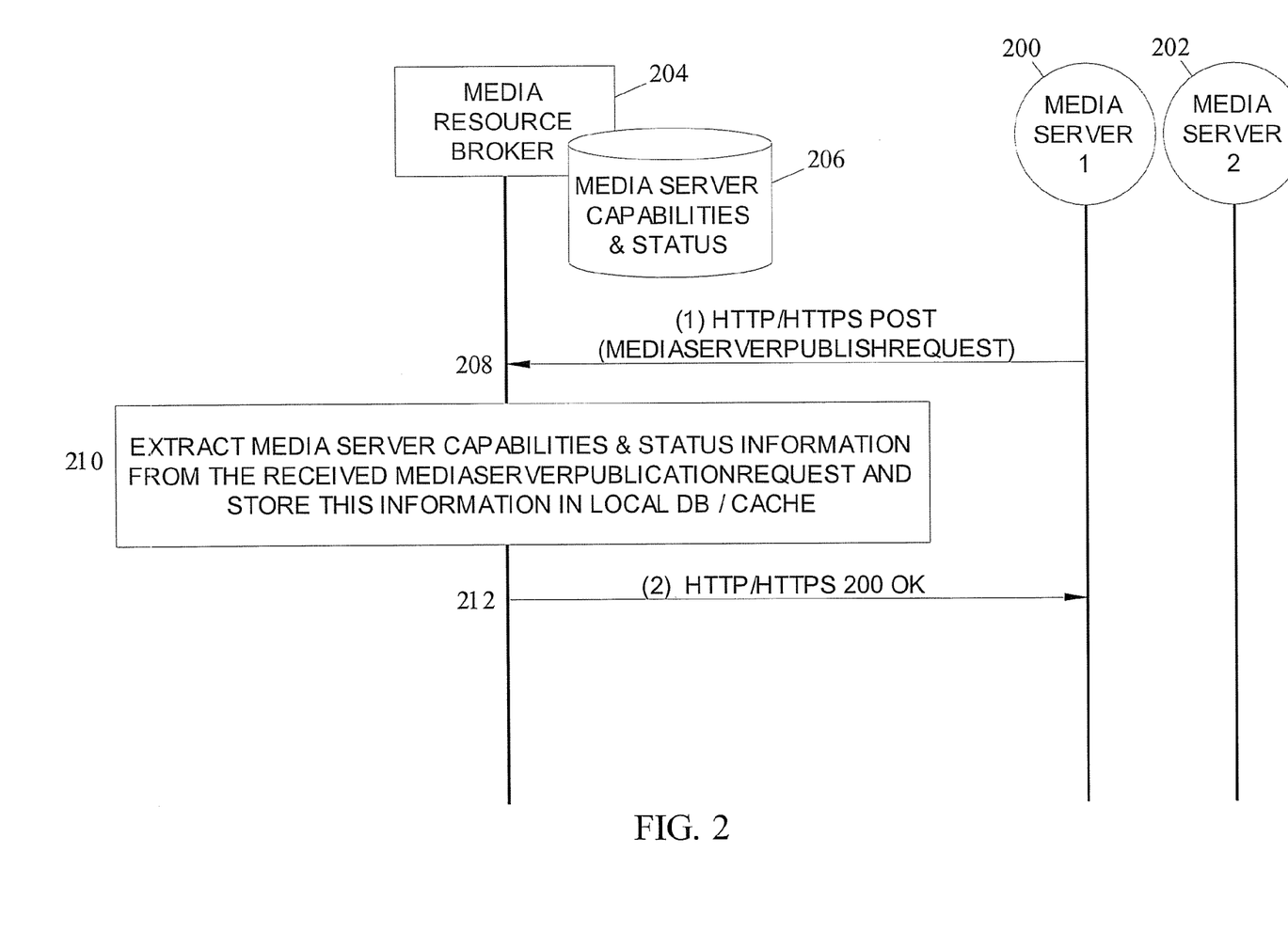
FIG. 2 is a message sequence diagram showing an exemplary "push" scenario for communicating media server capabilities and status information between a plurality of media servers and a media resource broker according to an embodiment of the subject matter described herein.

FIG. 2 is a message sequence diagram showing an exemplary "push" scenario for communicating media server capabilities and status information between a plurality of media servers and a media resource broker according to an embodiment of the subject matter described herein. Referring to FIG. 2, media servers 200 and 202 may provide support for announcement, interactive voice response (IVR), or other media processing functions associated with core telephony services.

In order for MRB 204 to use one of MS 200 or 202, MRB 204 needs to know about the existence, address and the capabilities of each MS 200 and 202. In one embodiment, MS 200 and 202 may publish capabilities and status information infrequently, such as after startup/initialization and/or after a change in configuration. In order to keep the interface between MRB 204 and MS 200 and 202 simple, media server capabilities and status information and status information may be sent using XML messages transported over HTTP/HTTPS transport protocols.

Media resource broker (MRB) 204 is a logical entity that may be responsible for both collection of appropriate published media server information and selecting appropriate MS resources on behalf of consuming entities. MRB 204 provides an abstraction, from an allocation perspective, of physical media servers for different client applications that make use of them. For example, clients request a media server by functionality, MRB 204 will allocate an appropriate physical media server (that provides the requested functionality) to the client. This model enables the sharing of media server resources across multiple using clients which can result in significant efficiencies in the quantity of media server resources that need to be deployed. It is appreciated that MRB 204 may support user datagram protocol (UDP), transport control protocol (TCP), and stream control transmission protocol (SCTP) as transport protocols for obtaining media server capabilities and status information.

MRB 204 may support two modes of operation: query mode and in-line mode. In query mode, MRB 204 may provide an interface for an Application Server to retrieve the address of an appropriate media server. The result returned to the application server can be influenced by information contained in the query request. In in-line mode, MRB 204 may directly receive requests on the signaling path.

Media server capabilities and status information and status cache 206 may include information about: the name and address, types of supported services, supported features, and various capacities of each media server 200 and 204. For example, status information may describe the current state of a media server in terms of load and available capacity. Without this information, MRB 204 might decide to use an overloaded media server.

At step 208, media server 200 may send a message to MRB 204 that includes its capabilities and operational status information. In the embodiment shown, the message sent by media server 200 may include a description of its capabilities in the body of an HTTP/HTTPS POST request. The MIME type contained in the HTTP/HTTPS request/response may be 'application/ms+xml'. This value may be reflected in the appropriate HTTP headers like 'Content-Type' and 'Accept'. The body of the POST request may contain the 'mediaServerPublishRequest' element. The 'mediaServerPublishRequest' element may be the primary container of information related to a media server publish request. The media server Publish Request may include information such as name and location, services, features, and capacity associated with a media server. Name and location may include information about the location of the server such as a URI or IP address. Services may include information about what kind of services are supported, such as conferencing, IVR, etc. Features may include information about what specific features the MS provides for the supported services. For example, if an MS provides IVR services then the list of features might include support for VXML, length of announcements, supported languages, etc. Capacity may include information about the number of supported parallel calls as well as the rate of accepted calls.

At step 210, MRB 204 may extract media server capabilities and status information and status information from the received 'mediaServerPublishRequest' element and store the information in cache 206.

At step 212, if an HTTP POST request containing the 'mediaRerverPublishRequest' is processed successfully, MRB 204 may respond to MS 200 with a 200 OK HTTP/HTTPS response message. This indicates that the request was received and processed. Alternatively, if processing the request resulted in an error (e.g., mis-formatted content or unrecognizable content), MRB 204 may return an application level error by including a 'mediaServerPublishError' element in the 200 OK HTTP/HTTPS response.

Figure 3:
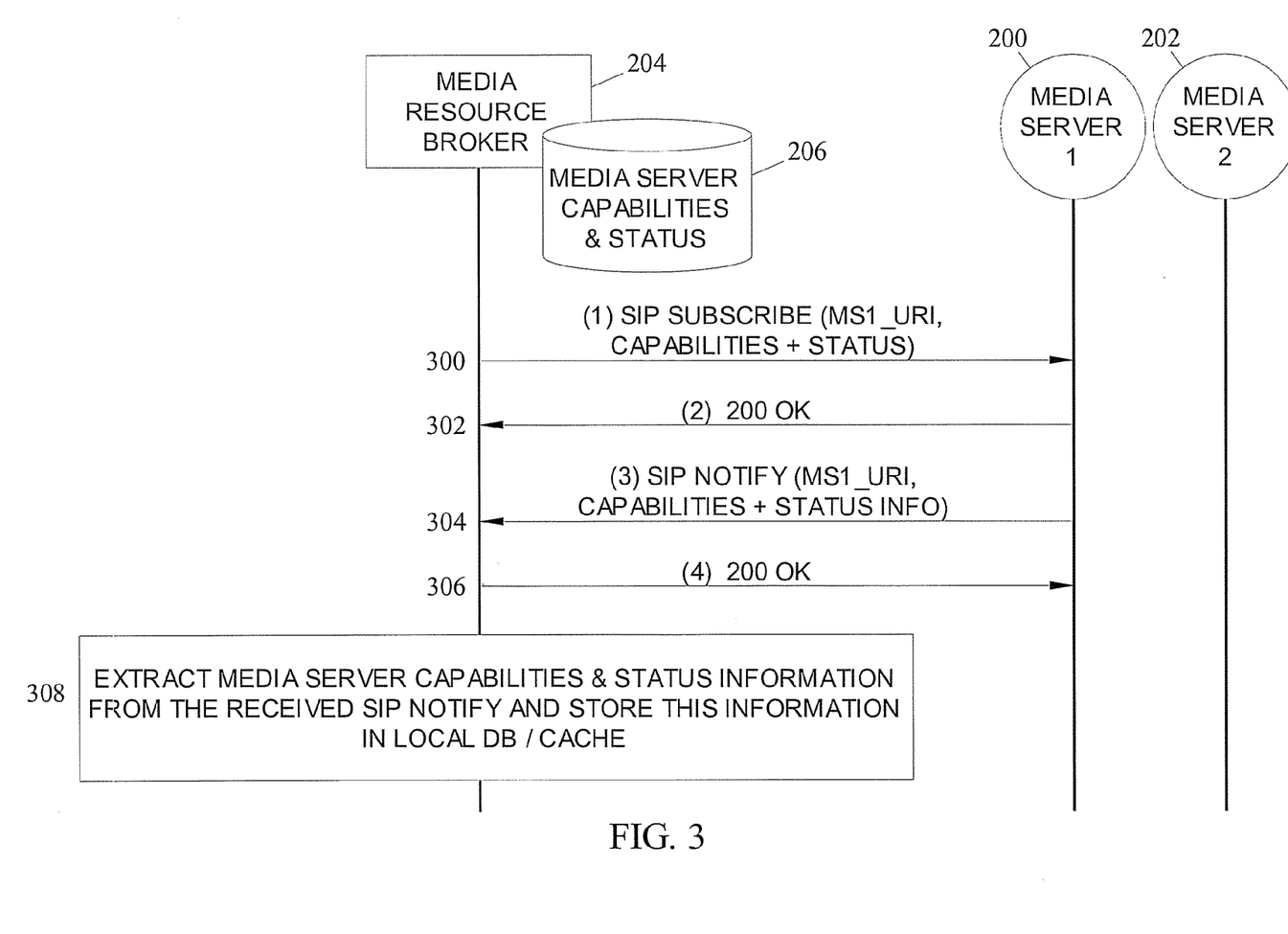
FIG. 3 is a message sequence diagram showing an exemplary "subscription" scenario for communicating media server capabilities and status information between a plurality of media servers and a media resource broker according to an embodiment of the subject matter described herein.

FIG. 3 is a message sequence diagram showing an exemplary "subscription" scenario for communicating media server capabilities and status information between a plurality of media servers and a media resource broker according to an embodiment of the subject matter described herein. Referring to FIG. 3, at step 300, MRB 204 may send media server 200 a SIP SUBSCRIBE message requesting a subscription to its capabilities and/or operational status information. Media server 200 may receive the subscription request and add MRB 204 as a capabilities and/or operational status "watcher".

At step 302, media server 200 returns a 200 OK message acknowledging receipt of the SUBSCRIBE message.

At step 304, media server 200 sends the MRB 204 a SIP NOTIFY message that includes to its capabilities and/or operational status information.

At step 306, MRB 204 returns a 200 OK message acknowledging receipt of the NOTIFY message.

At step 308, MRB 204 receives the NOTIFY message and extracts and stores the capabilities and/or operational status information in cache 206.

Figure 4:
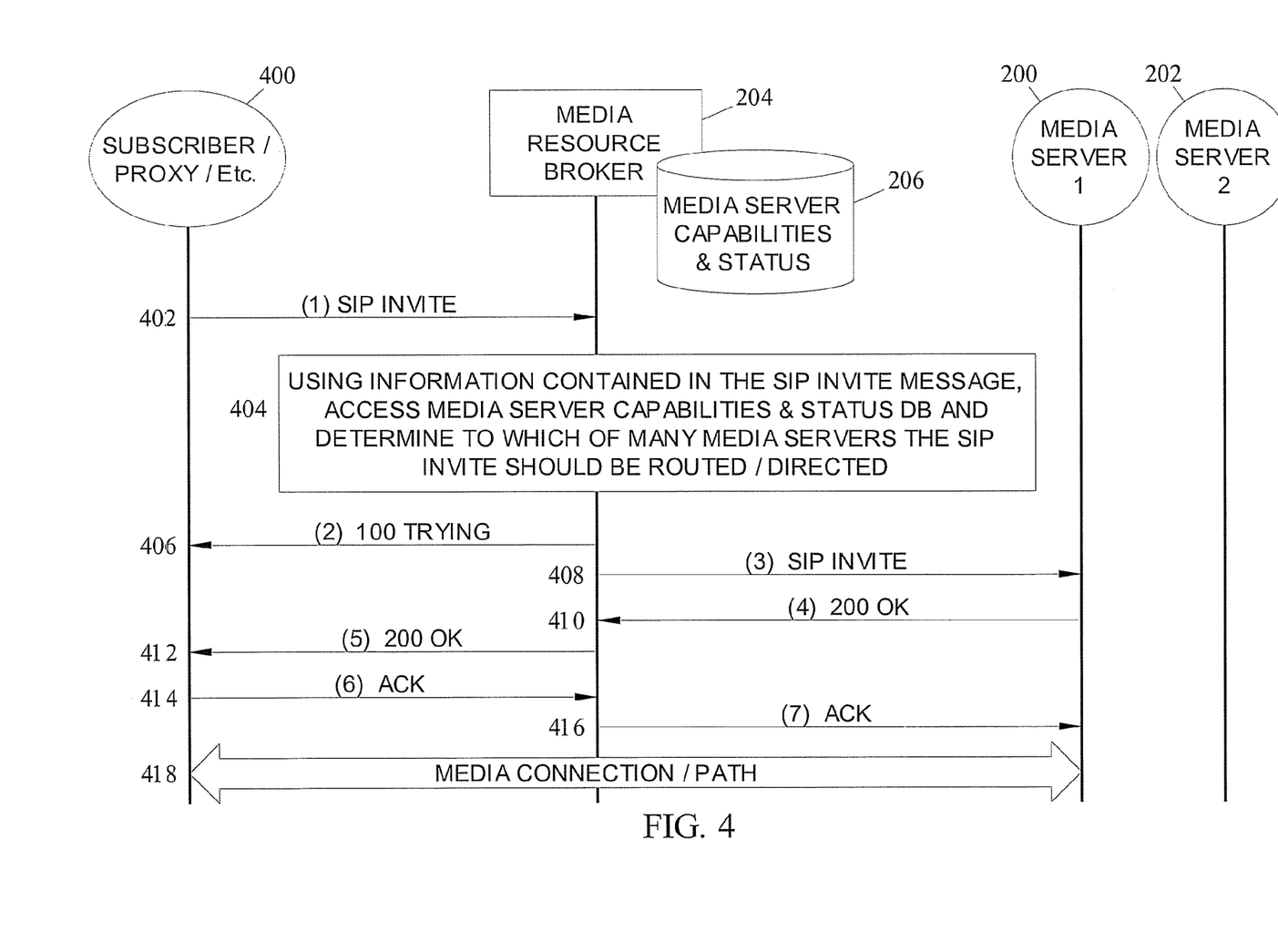
FIG. 4 is a message sequence diagram showing an exemplary media resource capabilities-based routing scenario based on previously communicated media server capabilities and status information between a plurality of media servers and a media resource broker according to an embodiment of the subject matter described herein.

FIG. 4 is a message sequence diagram showing an exemplary media resource capabilities-based routing scenario based on media server capabilities and status information communicated between a plurality of media servers and a media resource broker according to an embodiment of the subject matter described herein.

At step 402, clients may invoke MRB 204 by sending an INVITE to it which MRB 204 will propagate to an appropriate media server should one be available. MRB 204 may allocate media servers based on overall availability of media server resources and any additional user specific policies. In addition to making routing decisions based solely on media server capabilities and status information and status information, MRB 204 may also make routing decisions based on a combination of media server capabilities and status information and status information and information provided in client requests. Exemplary information that may be included in client requests and used for making routing decisions is described in greater detail below. It is appreciated that this list is not intended to be limiting and that other information may be used without departing from the scope of the subject matter described herein.

The Request-URI of the INVITE sent to MRB 204 indicates the media resources being requested. MRB 204 may support the annc, conf and dialog resources defined in IETF RFC 4240. For conf allocations, all concurrently active sessions with the same conference id value may be allocated to the same physical media server. It is the responsibility of the sending client to ensure all requests sharing the same conference-id are directed to the same media resource broker instance.

The following additional parameters may be included in the Request-URI to further influence the action of the media resource broker.

br-conf-size=<n>

This parameter may be used in conjunction with the conf=Request-URI (from RFC4240) in order to instruct MRB 204 the ultimate size of the conference being requested so an appropriate number of ports can be reserved. This parameter is not propagated to the media server itself.

br-affinity=<unique id>

This parameter can be used to indicate to MRB 204 that multiple requests should be allocated to the same physical media server. All concurrently active sessions that share the same unique id may be resolved to the same physical media server. This parameter is redundant for conf allocations and is not propagated to the media server itself.

br-mrid=<media server id>

This parameter can be used to indicate a request for a specific media server (identified by the <media server id>). The parameter may not be propagated to the media server itself.

br-capabilities=<comma separated list of capabilities>

This parameter allows the definition of custom media capabilities. When custom capabilities are used, MRB 204 may be configured with the capabilities supported by each media server under its allocation control. The request will be resolved to a media server supporting all the requested custom capabilities or, if not, the request may be rejected. The parameter may not be propagated to the media server itself.

The <From> header may be used to indicate the party for which the media server request is being made (for example which subscriber an Application Server acting on behalf of). If an INVITE is received with the clients own address (for example an application server using its own SIP address) then user level resource policies may not be supported by MRB 204.

At step 406, MRB 204 may generate an immediate 100 Trying respond to avoid any unnecessary re-sends of the INVITE.

At step 408, if a media server can be allocated for the request then the INVITE is propagated to it with a modified Request-URI indicating the specific media server and having any media resource broker specific parameters removed. In Monitored mode MRB 204 remains in the SIP path for the duration of the SIP dialog. In Call Rate Mode MRB 204 remains in the SIP path only to proxy or relay responses to the original INVITE.

Alternatively, if MRB 204 is unable to allocate a media server because all of the media servers it is managing the allocation for that could serve the request are currently unavailable (i.e. currently allocated to another request) then MRB 204 may return a 480 Temporarily Unavailable response indicating that the media resource broker cannot allocate the resource at this particular time. Should MRB 204 attempt to allocate a media server but receive an error response from it (e.g., 4xx, 5xx, 6xx) then it may attempt to allocate a different physical media server that can serve the request without notifying the client (thereby insulating it from any failures). The number of media server allocation attempts is configurable within MRB 204, if the number of unsuccessful attempts reaches this value then a 480 response may be returned to the client.

If MRB 204 is unable to allocate a media server because it does not manage a media server with the required capabilities then it may return a 488 Not Acceptable indicating that MRB 204 is not capable of the requested allocation. In deployments with multiple media resource brokers then if MRB 204 cannot serve the request, MRB 204 may respond with a 302 Moved Temporarily response message indicating another media resource broker (not shown) that the client may try.

At step 410, media server 200 may return to MRB 204 a 200 OK message acknowledging receipt of the INVITE message.

At step 412, MRB 204 may forward the 200 OK message to subscriber 400.

At step 414, subscriber 400 may return an Acknowledgment message to MRB 204 acknowledging receipt of the 200 OK message.

At step 416, MRB 204 may forward the Acknowledgment message to media server 200.

At step 418, a media connection/path may be established between subscriber 400 and media server 200.

Figure 5:
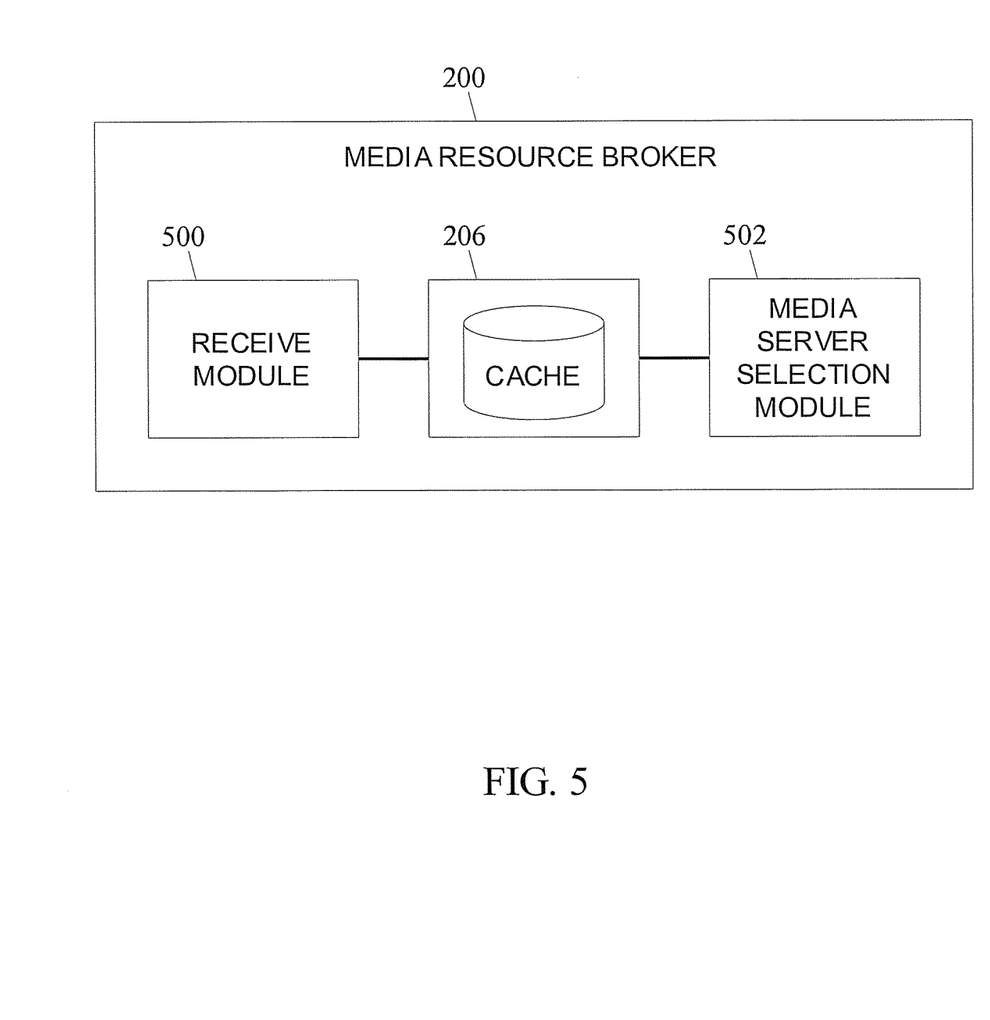
FIG. 5 is a system diagram showing an exemplary media resource broker for communicating media server capabilities and status information with a plurality of media servers according to an embodiment of the subject matter described herein.

FIG. 5 is a system diagram showing an exemplary media resource broker for communicating media server capabilities and status information with a plurality of media servers according to an embodiment of the subject matter described herein.

MRB 204 is a network element that sits between the application layer and the core network to provide and manage connectivity to the evolving network for multiple applications. It may include a purpose built, highly scalable, carrier grade network platform that enables legacy, intelligent network (IN), IP, and next generation IMS applications to be immune from the ever evolving network.

Communications module 500 may receive messages from a plurality of media servers, where the messages include information indicating capabilities of the media servers. For example, may include a description of its capabilities in the body of an HTTP/HTTPS POST request. The body of the POST request may contain the 'mediaServerPublishRequest' element which may be the primary container of information related to a media server publish request. The media server capabilities and status information and status information may include information such as name and location, services, features, and capacity associated with a media server.

Media server capabilities and status information cache 206 may cache (i.e., store) information regarding the capabilities and/or status of one or more media servers. As described above, in one possible embodiment, cache 206 may include a table or other data structure indexed by media server network address and/or another media server identifier. An exemplary cache 206 is shown in Table 1 below.

TABLE 1

Exemplary Media server capabilities and status information and Status Data

| Media Server Identifier | Network Address | Services | Service Features | Call Volume Capacity | Call Rate Capacity | Congestion Status |
|---|---|---|---|---|---|---|
| MS_1@Tmobile.com | 192.100.32.3 port 5060 | IVR | X | 2500 | 256 | 0 |
| MS_2@Tmobile.com | 192.100.32.3 port 6060 | Conferencing | Y | 1500 | 189 | 5 |

According to Table 1 above, the media server identified by MS_1@Tmobile.com may have a greater call volume capacity (e.g., total number of supported simultaneous active calls) and call rate capacity than the media server identified by MS_2@Tmobile.com. Additionally, the media server identified by MS_1@Tmobile.com may be less congested than the media server identified by MS_2@Tmobile.com as indicated by the congestion status information (e.g., 0=no congestion, 10=maximum congestion).

Media server selection module 502 receives call setup requests and, in response to the call setup requests, selects media servers from the plurality of media servers using the cached media server capabilities and status information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for communicating media server capabilities and status information between a plurality of media servers and a media resource broker, the method comprising:

at a media resource broker:
   receiving messages from a plurality of media servers, the messages including information indicating capabilities and status of the media servers, wherein the information indicating capabilities and status of the media servers includes a call rate capacity indicating a total number of calls during a given time period that can be accepted by a given media server, wherein receiving messages from a plurality of media servers includes subscribing to the plurality of media servers for requesting the information indicating the capabilities and status of the media servers, wherein receiving the messages including information indicating capabilities and status of the media servers includes receiving SIP messages with header fields including one or more SIP overload control parameters;

caching the information regarding the capabilities and status of the media servers; and receiving call setup requests and, in response, selecting media servers from the plurality of media servers based on the cached media server capabilities and status information.

2. The method of claim 1 wherein subscribing to the plurality of media servers includes receiving a Notify message from each of the plurality of media servers in response to a change in the information indicating the capabilities and status of the media servers.

3. The method of claim 1 wherein receiving messages from a plurality of media servers includes receiving a Publish message from each of the plurality of media servers.

4. The method of claim 1 wherein receiving the messages including information indicating capabilities and status of the media servers includes receiving messages using one of user datagram protocol (UDP), transport control protocol (TCP), and stream control transmission protocol (SCTP) as transport protocols for obtaining media server capabilities and status information.

5. The method of claim 1 wherein the capabilities and status information includes at least one of the services, service features, and load status of the plurality of media servers.

6. The method of claim 1 wherein receiving the messages from the plurality of media servers includes receiving messages pushed by the media servers to the media resource broker, wherein pushing includes sending not in response to a request.

7. The method of claim 1 wherein receiving the messages from the plurality of media servers includes receiving the messages in response to requests from the media resource broker to the media servers.

8. A media resource broker for communicating capabilities and status information between a plurality of media servers, the media resource broker comprising:

at a media resource broker include a processor and a memory:

a communications module implemented at the media resource broker, the communications module is configured to receive messages from a plurality of media servers, the messages including information indicating capabilities and status of the media servers, wherein the information indicating capabilities and status of the media servers includes a call rate capacity indicating a total number of calls during a given time period that can be accepted by a given media server, wherein the communications module is configured to subscribe to the plurality of media servers for requesting the information indicating the capabilities and status of the media servers, wherein the communications module is configured to receive SIP messages with header fields including one or more SIP overload control parameters;

a media server capabilities and status information cache implemented at the media resource broker, the media server capabilities and status information cache is configured to cache the information regarding the capabilities and status of the media server; and a media server selection module implemented at the media resource broker, the media server selection module is configured to receive call setup requests and, in response, selecting media servers from the plurality of media servers using the cached media server capabilities and status information.

9. The media resource broker of claim 8 wherein the communications module is configured to receive a Notify message from each of the plurality of media servers in response to a change in the capabilities and status of the media servers.

10. The media resource broker of claim 8 wherein the communications module is configured to receive a Publish message from each of the plurality of media servers.

11. The media resource broker of claim 8 wherein the communications module is configured to receive messages using one of user datagram protocol (UDP), transport control protocol (TCP), and stream control transmission protocol (SCTP) as transport protocols for obtaining media server capabilities and status information.

12. The media resource broker of claim 8 wherein the information indicating capabilities and status of the plurality of media servers indicates at least one of the services, service features, and load status of the plurality of media servers.

13. The media resource broker of claim 8 wherein the communications module is configured to passively receive the information indicating capabilities and status from the plurality of media servers without sending requests.

14. The media resource broker of claim 8 wherein the communications module is configured to request, from the media servers, the information indicating capabilities and status of the media servers.

15. A non-transitory computer readable medium comprising computer executable instructions that when executed by a processor of a computer performs steps comprising:

at a media resource broker:

receiving messages from a plurality of media servers, the messages including information indicating capabilities and status of the media servers, wherein the information indicating capabilities and status of the media servers includes a call rate capacity indicating a total number of calls during a given time period that can be accepted by a given media server, wherein receiving messages from a plurality of media servers includes subscribing to the plurality of media servers for requesting the information indicating the capabilities and status of the media servers, wherein receiving the messages including information indicating capabilities and status of the media servers includes receiving SIP messages with header fields including one or more SIP overload control parameters;

caching the information regarding the capabilities and status of the media servers; and receiving call setup requests and, in response, selecting media servers from the plurality of media servers using the cached media server capabilities and status information.

\* \* \* \* \*